(12) United States Patent
Ahopelto et al.

(10) Patent No.: US 7,660,862 B2
(45) Date of Patent: Feb. 9, 2010

(54) APPARATUS AND METHOD OF TRACKING ACCESS STATUS OF STORE-AND-FORWARD MESSAGES

(75) Inventors: Timo Ahopelto, Helsinki (FI); Donald Peppers, Sea Island, GA (US); Kai Friman, Espoo (FI)

(73) Assignee: CVON Innovations Limited, London (GB)

( * ) Notice: Subject to any disclaimer, the term of this patent is extended or adjusted under 35 U.S.C. 154(b) by 123 days.

(21) Appl. No.: 11/888,446

(22) Filed: Aug. 1, 2007

(65) Prior Publication Data

US 2008/0082617 A1    Apr. 3, 2008

(30) Foreign Application Priority Data

Aug. 9, 2006  (GB) ................... 0615833.1

(51) Int. Cl.
   *G06F 15/16* (2006.01)
(52) U.S. Cl. .................. 709/206; 709/217; 709/227
(58) Field of Classification Search .............. 709/200, 709/201–203, 206
   See application file for complete search history.

(56) References Cited

U.S. PATENT DOCUMENTS

| | | | |
|---|---|---|---|
| 5,408,519 | A | 4/1995 | Pierce et al. |
| 5,678,179 | A | 10/1997 | Turcotte et al. |
| 5,978,775 | A | 11/1999 | Chen |
| 5,978,833 | A | 11/1999 | Pashley et al. |
| 6,023,700 | A | 2/2000 | Owens et al. |
| 6,097,942 | A | 8/2000 | Laiho |
| 6,202,086 | B1 | 3/2001 | Maruyama et al. |
| 6,345,279 | B1 | 2/2002 | Li et al. |
| 6,647,269 | B2 | 11/2003 | Hendrey et al. |
| 6,889,054 | B2 | 5/2005 | Himmel et al. |
| 7,072,947 | B1 | 7/2006 | Knox et al. |

(Continued)

FOREIGN PATENT DOCUMENTS

DE    199 41 461 A1    3/2001

(Continued)

OTHER PUBLICATIONS

Communication Pursuant to Article 94(3) EPC dated Nov. 21, 2008 issued in connection with counterpart European Application No. 08 802 544.2.

(Continued)

*Primary Examiner*—Joseph E Avellino
*Assistant Examiner*—Jackie Zuniga
(74) *Attorney, Agent, or Firm*—Frishauf, Holtz, Goodman & Chick, P.C.; Robert P. Michal

(57) ABSTRACT

A method of selecting a recipient of a message on the basis of data identifying access to previously transmitted messages, wherein each said message includes content data for display within a display area of a receiving terminal and control data including data indicative of a user selectable portion within the display area. The method includes receiving content data having one of a plurality of different types for use in creating said message, accessing tracking data corresponding to a previously transmitted message containing content data of a given type, the tracking data being indicative of selection of said user selectable portion upon display thereof at said receiving terminal, and selecting a recipient of the message on the basis of the received content data and the tracking data.

32 Claims, 5 Drawing Sheets

U.S. PATENT DOCUMENTS

| | | |
|---|---|---|
| 7,155,243 B2 | 12/2006 | Baldwin et al. |
| 2002/0032602 A1 | 3/2002 | Lanzillo, Jr. et al. |
| 2002/0077130 A1 | 6/2002 | Owensby |
| 2002/0128908 A1 | 9/2002 | Levin et al. |
| 2002/0137507 A1 | 9/2002 | Winkler |
| 2002/0138291 A1 | 9/2002 | Vaidyanathan et al. |
| 2003/0040297 A1 | 2/2003 | Pecen et al. |
| 2003/0040300 A1 | 2/2003 | Bodic et al. |
| 2003/0110171 A1 | 6/2003 | Ozer et al. |
| 2003/0197719 A1 | 10/2003 | Lincke et al. |
| 2004/0103157 A1 | 5/2004 | Requena et al. |
| 2004/0158612 A1 | 8/2004 | Concannon |
| 2004/0192359 A1 | 9/2004 | McRaild et al. |
| 2004/0203851 A1 | 10/2004 | Vetro et al. |
| 2004/0209649 A1 | 10/2004 | Lord |
| 2004/0254993 A1 | 12/2004 | Mamas |
| 2004/0254994 A1 | 12/2004 | Diorio et al. |
| 2004/0259526 A1 | 12/2004 | Goris et al. |
| 2005/0027676 A1 | 2/2005 | Eichstaedt et al. |
| 2005/0125397 A1 | 6/2005 | Gross et al. |
| 2006/0025163 A1 | 2/2006 | Smith et al. |
| 2006/0031327 A1 | 2/2006 | Kredo |
| 2006/0041470 A1 | 2/2006 | Filho et al. |
| 2006/0085395 A1 | 4/2006 | Cradick et al. |
| 2006/0123014 A1 | 6/2006 | Ng |
| 2006/0190331 A1 | 8/2006 | Tollinger et al. |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0253327 A1 | 11/2006 | Morris et al. |
| 2006/0276170 A1 | 12/2006 | Radhakrishnan et al. |
| 2006/0276213 A1 | 12/2006 | Gottschalk et al. |
| 2006/0286963 A1 | 12/2006 | Koskinen et al. |
| 2006/0288124 A1 | 12/2006 | Kraft et al. |
| 2007/0004380 A1 | 1/2007 | Ylikoski |
| 2007/0016488 A1 | 1/2007 | Ulenas |
| 2007/0033104 A1 | 2/2007 | Collins et al. |
| 2007/0038711 A1 | 2/2007 | MacBeth et al. |
| 2007/0074262 A1 | 3/2007 | Kikkoji et al. |
| 2007/0100805 A1 | 5/2007 | Ramer et al. |
| 2007/0174295 A1 | 7/2007 | Abraham et al. |
| 2007/0237330 A1 | 10/2007 | Srivastava |

FOREIGN PATENT DOCUMENTS

| | | | |
|---|---|---|---|
| EP | 1 073 293 A1 | 1/2001 | |
| EP | 1 109 371 A2 | 6/2001 | |
| EP | 1 161 093 A2 | 12/2001 | |
| EP | 1 193 955 A2 | 4/2002 | |
| EP | 1 220 132 A2 | 7/2002 | |
| EP | 1 239 395 A2 | 9/2002 | |
| EP | 1 253 542 A2 | 10/2002 | |
| EP | 1 298 945 A1 | 4/2003 | |
| EP | 1 324 250 A1 | 7/2003 | |
| EP | 1 365 604 A2 | 11/2003 | |
| EP | 1 455 511 A1 | 9/2004 | |
| EP | 1 542 482 A2 | 6/2005 | |
| EP | 1 587 332 A1 | 10/2005 | |
| EP | 1 613 102 A1 | 1/2006 | |
| EP | 1 615 455 A1 | 1/2006 | |
| EP | 1 633 100 A1 | 3/2006 | |
| GB | 2 352 856 A | 2/2001 | |
| GB | 2 356 777 A | 5/2001 | |
| GB | 2 383 149 A | 6/2003 | |
| GB | 2 406 996 A | 4/2005 | |
| GB | 2 407 002 A | 4/2005 | |
| JP | 2002/140272 | 5/2002 | |
| WO | WO 96/24213 A1 | 8/1996 | |
| WO | WO 97/33421 A1 | 9/1997 | |
| WO | WO 98/37685 | 8/1998 | |
| WO | WO 00/44151 A2 | 7/2000 | |
| WO | WO 01/22748 A1 | 3/2001 | |
| WO | WO 01/31497 A1 | 5/2001 | |
| WO | WO 01/55892 A1 | 8/2001 | |
| WO | WO 01/57705 A1 | 8/2001 | |
| WO | WO 01/58178 A2 | 8/2001 | |
| WO | WO 01/65411 A1 | 9/2001 | |
| WO | WO 01/69406 A1 | 9/2001 | |
| WO | WO 01/71949 A1 | 9/2001 | |
| WO | WO 01/72063 A1 | 9/2001 | |
| WO | WO 01/77840 A1 | 10/2001 | |
| WO | WO 01/78425 A1 | 10/2001 | |
| WO | WO 01/91400 A2 | 11/2001 | |
| WO | WO 01/93551 A2 | 12/2001 | |
| WO | WO 01/97539 A2 | 12/2001 | |
| WO | WO 02/31624 A2 | 4/2002 | |
| WO | WO 02/44834 A2 | 6/2002 | |
| WO | WO 02/054803 A1 | 7/2002 | |
| WO | WO 02/059720 A1 | 8/2002 | |
| WO | WO 02/069585 A2 | 9/2002 | |
| WO | WO 02/075574 A1 | 9/2002 | |
| WO | WO 02/080595 A1 | 10/2002 | |
| WO | WO 02/084895 A1 | 10/2002 | |
| WO | WO 03/015430 A1 | 2/2003 | |
| WO | WO 03/019845 A2 | 3/2003 | |
| WO | WO 03/024136 A1 | 3/2003 | |
| WO | WO 03/038638 A1 | 5/2003 | |
| WO | WO 03/088690 A1 | 10/2003 | |
| WO | WO 2004/034671 A1 | 4/2004 | |
| WO | WO 2004/054205 A1 | 6/2004 | |
| WO | WO 2004/084532 A1 | 9/2004 | |
| WO | WO 2004/086791 A1 | 10/2004 | |
| WO | WO 2004/100470 A1 | 11/2004 | |
| WO | WO 2004/100521 A1 | 11/2004 | |
| WO | WO 2004/114109 A1 | 12/2004 | |
| WO | WO 2005/015806 A2 | 2/2005 | |
| WO | WO 2005/029769 A1 | 3/2005 | |
| WO | WO 2005/062637 A1 | 7/2005 | |
| WO | WO 2005/076650 A1 | 8/2005 | |
| WO | WO 2006/002869 A1 | 1/2006 | |
| WO | WO 2006/005001 A2 | 1/2006 | |
| WO | WO 2006/026505 A2 | 3/2006 | |
| WO | WO 2006/027407 A1 | 3/2006 | |
| WO | WO 2006/093284 A1 | 9/2006 | |
| WO | WO 2006/110446 A1 | 10/2006 | |
| WO | WO 2006/119481 A2 | 11/2006 | |
| WO | WO 2007/056698 A2 | 5/2007 | |
| WO | WO 2008/013437 A1 | 1/2008 | |

OTHER PUBLICATIONS

Office Action dated Feb. 2, 2009 issued in related U.S. Appl. No. 12/075,853.

Office Action dated Mar. 3, 2009 issued in related U.S. Appl. No. 12/075,862 (24 pages).

U.K. Search Report under Section 17 dated Nov. 20, 2006 issued in connection with corresponding U.K. Application No. GB 0615833.1.

U.K. Search Report under Section 17 dated Apr. 17, 2007 issued in connection with corresponding U.K. Application No. GB 0705651.8.

International Search Report (Form PCT/ISA/206) issued in connection with corresponding International Application PCT/EP2007/058243.

International Search Report (Form PCT/ISA/210) mailed Feb. 7, 2008 issued in connection with corresponding International Application PCT/EP2007/058243.

Communication Pursuant to Article 94(3) EPC dated Aug. 13, 2009 issued by the European Patent Office in related European Patent Application No. 07 802 544.2 (4 pages).

PCT Notification of Transmittal of the International Search Report and the Written Opinion of the International Searching Authority, or the Declaration (3 pgs), PCT International Search Report (2 pgs), and PCT Written Opinion of the International Searching Authority (8 pgs) mailed Jun. 19, 2009 on a related foreign PCT application PCT/EP2008/056069 issued by PCT International Searching Authority.

Office Action dated Sep. 3, 2009 issued in related U.S. Appl. No. 12/075,862 (19 pages).

Office Action issued from the U.S. Patent and Trademark Office dated Sep. 29, 2009 issued in related U.S. Application Serial No. 12/075,853 (10 pages).

APPARATUS AND METHOD OF TRACKING ACCESS STATUS OF STORE-AND-FORWARD MESSAGES

FIELD OF THE INVENTION

The present invention relates to a messaging system for creating messages on the basis of actions taken in respect of previously transmitted messages within a communications network, and is particularly, but not exclusively, suited to creating such messages for delivery within a mobile communications network.

BACKGROUND OF THE INVENTION

Currently the Short Message Service (SMS), the Multimedia Messaging Service (MMS) and Wireless Application Protocol (WAP) are the media of choice for personal and service-originated (that is to say information and marketing) mobile messaging. The MMS and WAP services facilitate transmission of messages of unlimited size and virtually any content type within the limitations of mobile terminals, and can be compiled as HTTP messages, which means that they offer a transaction capability with possible super-distribution of content along with accuracy, tracking and feedback of messages. Both messaging types provide a significant improvement—in terms of range and quality of content—over SMS messaging, which is limited to alphanumeric characters.

Telecommunications networks commonly include WAP and Media Gateways, which can track delivery of a WAP and MMS messages to a certain terminal. However, there is no means of identifying what has happened to the message post-delivery: a message can be delivered but deleted before review by the recipient, or forwarded without review by the recipient; in either case current network infrastructure will only be able to track delivery of the message primarily from their gateway elements. This is perhaps not surprising given the responsibility of the network operator, which broadly speaking is limited to the delivery of messages between source and destination addresses. It will be appreciated that influencing a recipient's decision to review a message that has been delivered is quite separate from the mechanics of message transmission, since the latter is dependent on message parameters including sender and content, both of which are often outside of the control of the network operator.

There is therefore a significant difference between delivery of a message and review of the message content, and in view of the fact that subsequent actions taken by the recipient are of interest to the providers of the message content and/or source of the message, there is motivation to develop a means for tracking actions performed in relation to a message subsequent to delivery thereof.

This has been addressed in the field of email messaging, where, as described in US patent U.S. Pat. No. 7,072,947, one solution is to provide an email messaging system arranged to intercept all outgoing emails from a mail server and modify each outgoing email so as to include a tracking code, which is embedded within an image call included in the outgoing email. If the outgoing email contains hyperlinks, each hyperlink is also modified to include the tracking code. The tracking code is uniquely associated with the outgoing email, each individual recipient of the outgoing email (in the case where the outgoing email is addressed to multiple individuals, for example, using the "cc" field of an email), the sender of the outgoing email, or the sender's business association, or a combination thereof. The image call and the embedded tracking code are used to detect when the recipient of the outgoing email has opened an email. The email system associates a cookie with the recipient of the outgoing email, and when the email system receives an image call (i.e. when the recipient has accessed the email), the corresponding image and the cookie are concurrently delivered to the recipient. The cookie is used to monitor the behaviour of the recipient at a website, regardless of how the recipient arrives at that website, be it through a click-through from the email or otherwise.

It will be appreciated that such an arrangement is targeted towards monitoring, in an ongoing sense, user interactions at a given website in the Internet world, and thus that the email message acts as an intermediary to draw traffic to the website containing the information rather than being an end and the primary source of information in itself. It will also be appreciated that because the email provides the means to monitor behaviour at a web site, the process is fairly intensive in terms of usage of network resources when applied to the wireless networks: sending of the email involves one PDP context, the fetching the email from server involves another, pressing the link involves a third context and accessing the third party event server is potentially a fourth context. The number of PDP contexts is the key metric when determining the load on given network elements as well as the technical complexity and infrastructure requirements of such elements for the wireless operators, so it is desirable to minimise the number of contexts involved in message delivery.

SUMMARY OF THE INVENTION

In accordance with a first aspect of the present invention, there is provided a method of selecting a recipient of a message on the basis of data identifying access to previously transmitted messages, each said message comprising content data for display within a display area of a receiving terminal and control data comprising data indicative of a user selectable portion within the display area, the method comprising:

receiving content data having one of a plurality of different types for use in creating a said message;

accessing tracking data corresponding to a previously transmitted message containing content data of a given type, the tracking data being indicative of selection of a said user selectable portion upon display thereof at a said receiving terminal; and selecting a recipient of the message on the basis of the received content data and the tracking data.

Embodiments of the first aspect of the invention thus provide a means of targeting follow-up recipients with content data (such as images, information, presented as text and/or audio), the recipients being known to have previously reviewed and thus become aware of particular types of content. The content data can be characterised by means of various attributes and classified as being of the given, or other, type of content on the basis of the attributes. Alternatively content data can have an identification record associated therewith, identifying its type. This therefore provides a means of categorising content data which is used to match against newly received content data, and thence selection of recipients that have previously reviewed similar content.

According to a second aspect of the present invention there is provided a method of tracking access status of store-and-forward messages transmitted in a communications network, the method comprising:

selecting content for insertion within a store-and-forward message, the content including data for display within a display of a receiving terminal and control data comprising data indicative of a user selectable portion within the display, said display data including data for display in the user selectable portion;

creating a store-and-forward message comprising the selected content for transmission to a receiving terminal;

transmitting the created store-and-forward message to the receiving terminal; and responsive to receipt of data indicative of selection of the user selectable portion within the display, modifying the access status of the transmitted store-and-forward message, wherein the display data and the control data originate from a network location other than a terminal adapted to send messages in the communications network.

Embodiments of the second aspect of the invention thus apply to messages such as WAP, MMS and SMS messages, and operate so as to assemble a message from content and a user selectable portion that have not originated as a message from another terminal.

Embodiments of the various aspects of the invention differ substantially from arrangements such as that described in U.S. Pat. No. 7,072,947 on two levels: firstly in the relationship between the tracking code and the content of the message, and secondly in the way in which tracking data are used and how the system is implemented in wireless data network context. In relation to the first point of distinction, the information that the sender of the message wants the recipient to see is contained within the message itself, rather than being accessible via a link. This means that the tracking data indicate exactly what information has been reviewed as opposed to providing an indication that a particular web page (which might change over time) has been viewed. It is precisely this distinction that enables embodiments of the invention to be realised: future recipients of messages can be selected on the basis of them having already reviewed at least one previously transmitted message containing information of the same, similar, or related in a known manner, type, which has the advantage of enabling advertisers, for example, to target future messages more accurately than is currently possible.

Since the content data are included within the message instead of being accessible via a link, a further advantage of embodiments of the invention is that there is no need for the recipient to wait for various handshake and connectivity actions to be completed before viewing the content data. In addition to this being advantageous from the point of view of the end user, it is also beneficial from the point of view of utilisation of network resources, since fewer network resources (in terms of numbers and duration) are required.

The receiving terminal can operate in one of a plurality of modes in dependence on selection of the user selectable portion; one such mode involves the receiving terminal sending a response message identifying the receiving terminal to the network location, which causes the access status of the message to be updated at the network location.

The control data can comprise a set of processable instructions for use in controlling operation of a receiving terminal in dependence on selection of the user selectable portion: for example, in one arrangement the control data can comprise data that cause the receiving terminal to send the response message to the network location from which the store-and-forward message is transmitted. Alternatively the control data comprise data that cause the receiving terminal to send the response message to a network location other than that from which the store-and-forward message is transmitted.

Once a response message has been received, the method preferably comprises updating the access status of the content data, so as to identify the receiving terminal from which the selection data (in the form of a response message) have emanated.

According to a further aspect of the present invention there is provided a system for performing the aforesaid methods.

The features and advantages described in the dependent claims of the application will become apparent from the following description of preferred embodiments of the invention, given by way of example only, which is made with reference to the accompanying drawings.

DETAILED DESCRIPTION OF THE INVENTION

Embodiments of the invention are concerned with tracking user access to messages, specifically tracking access by capturing an action taken by the user in relation to the message, and using that information to determine content and/or recipients of subsequent messages. The content of the messages being tracked and the nature of the action being taken will be described in detail later in the description, but first a description of the infrastructure needed to support the delivery and tracking of the message will be described.

Figure 1:
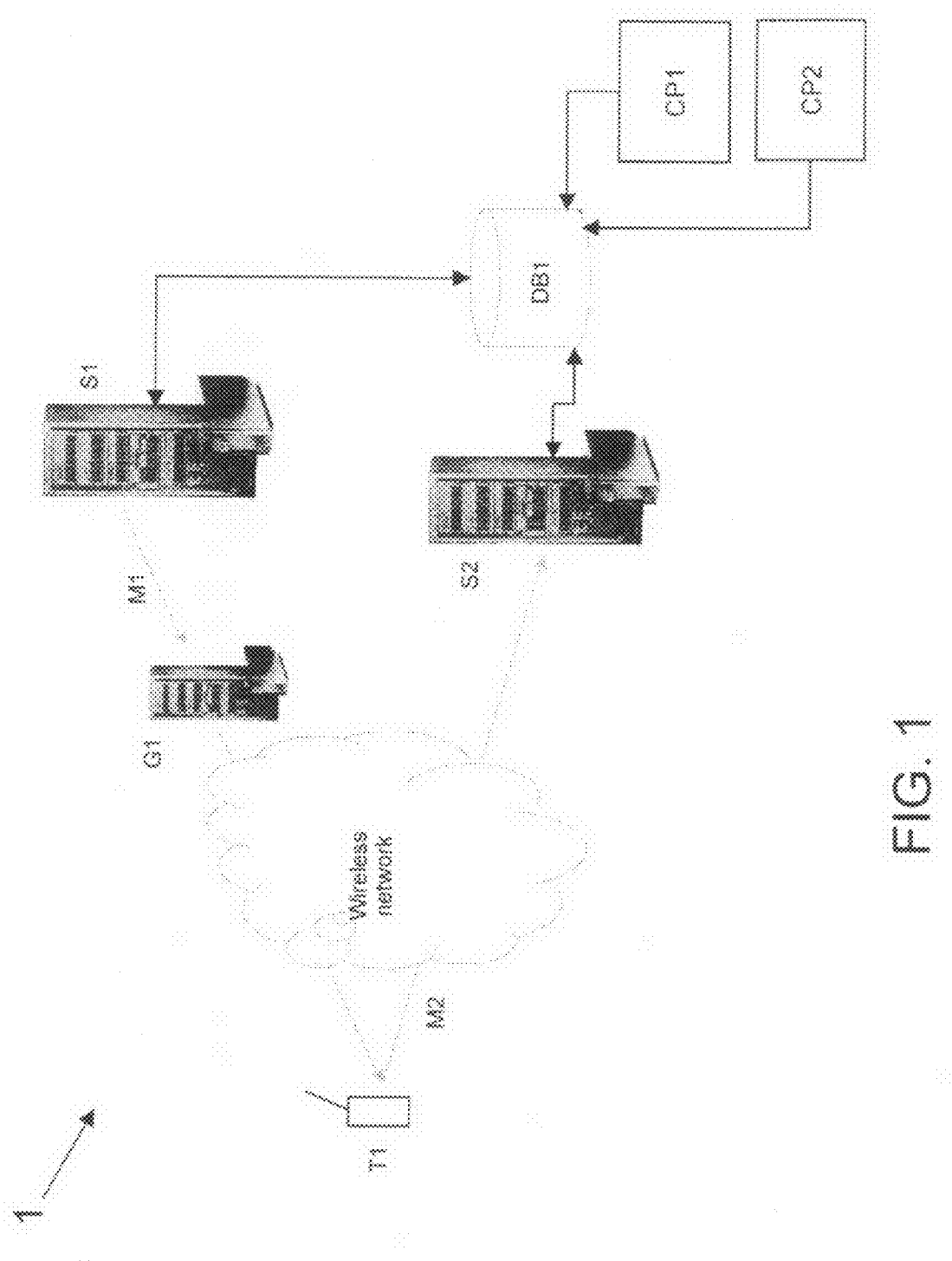
FIG. 1 is a schematic diagram showing a mobile network and network components arranged in accordance with an embodiment of the invention.

FIG. 1 shows an example of a data messaging system 1 within which embodiments of a first aspect of the invention operate; the arrows indicate data flows within the data messaging system 1 and the objects indicate components of the data messaging system 1. This Figure shows an arrangement of network components suitable for the delivery of WAP messages, but the messages could be short messages (SMS), Multimedia messages (MMS messages), bespoke messages in the form of GPRS data and/or streamed data; as will be appreciated, the specific arrangement of the data messaging system 1 is dependent on the type of message being transmitted.

In the arrangement shown in FIG. 1, a terminal MS communicates with various network devices within the data messaging system 1. The terminal T1 may be a wireless terminal such as a mobile phone, a PDA or a Laptop computer. The data messaging system 1 comprises: a WAP gateway G1, which is typically a network operator's WAP gateway; Web and WAP services servers S1, S2; and a database DB1, arranged to store data in respect of subscribers of the data messaging system 1; data in respect of terminals such as T1; and data in respect of content, including image (static, dynamic and/or interactive images), alphanumeric characters and content control information, the data having been provided by various content providers CP1, CP2. The subscriber data include tracking data indicative of actions taken on the part of the subscriber in relation to messages previously transmitted via the data messaging system 1, these messages being identified by the content included therein.

In one arrangement the services servers S1, S2 and the database DB1 are located within a proprietary network, which means that they operate independently of any specific network operator and can be shared across a plurality of network operators. The database DB1 can either be provided by two separate databases or by a single database as shown in FIG. 1, and, while the services servers S1, S2 are shown as two distinct network components, they can alternatively be embodied as one physical device equipped with the functionality corresponding to the respective servers and described below. Using techniques known in the art, the database DB1 can store preference and demographic data relating to subscribers, these data being used to control selection of content as described below.

Figure 2:
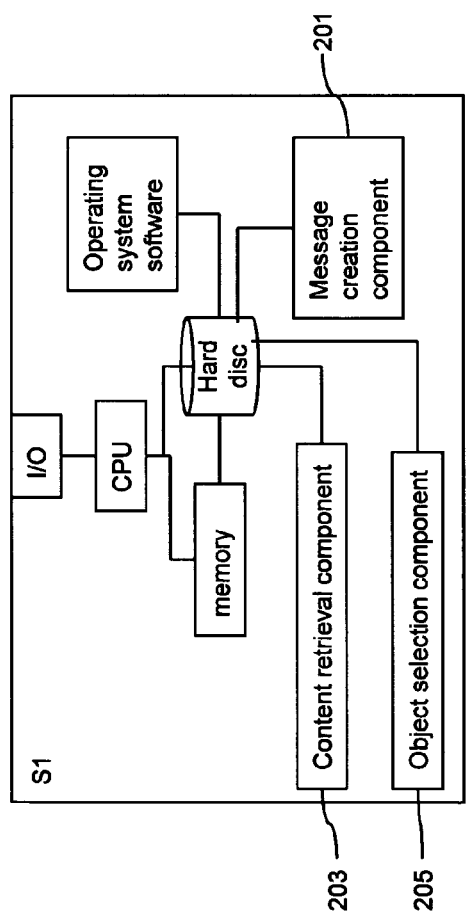
FIG. 2 is a schematic block diagram showing in detail the functionality associated with a first service server shown in FIG. 1.
Figure 3:
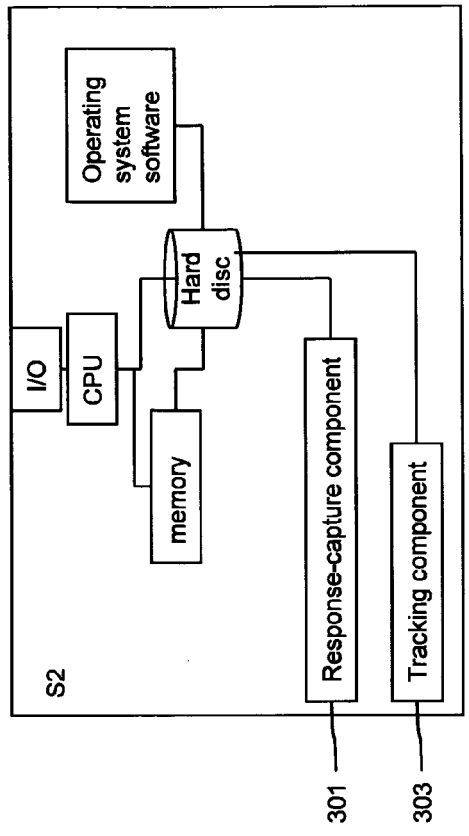
FIG. 3 is a schematic block diagram showing in detail the functionality associated with a second service server shown in FIG. 1.
Figure 4:
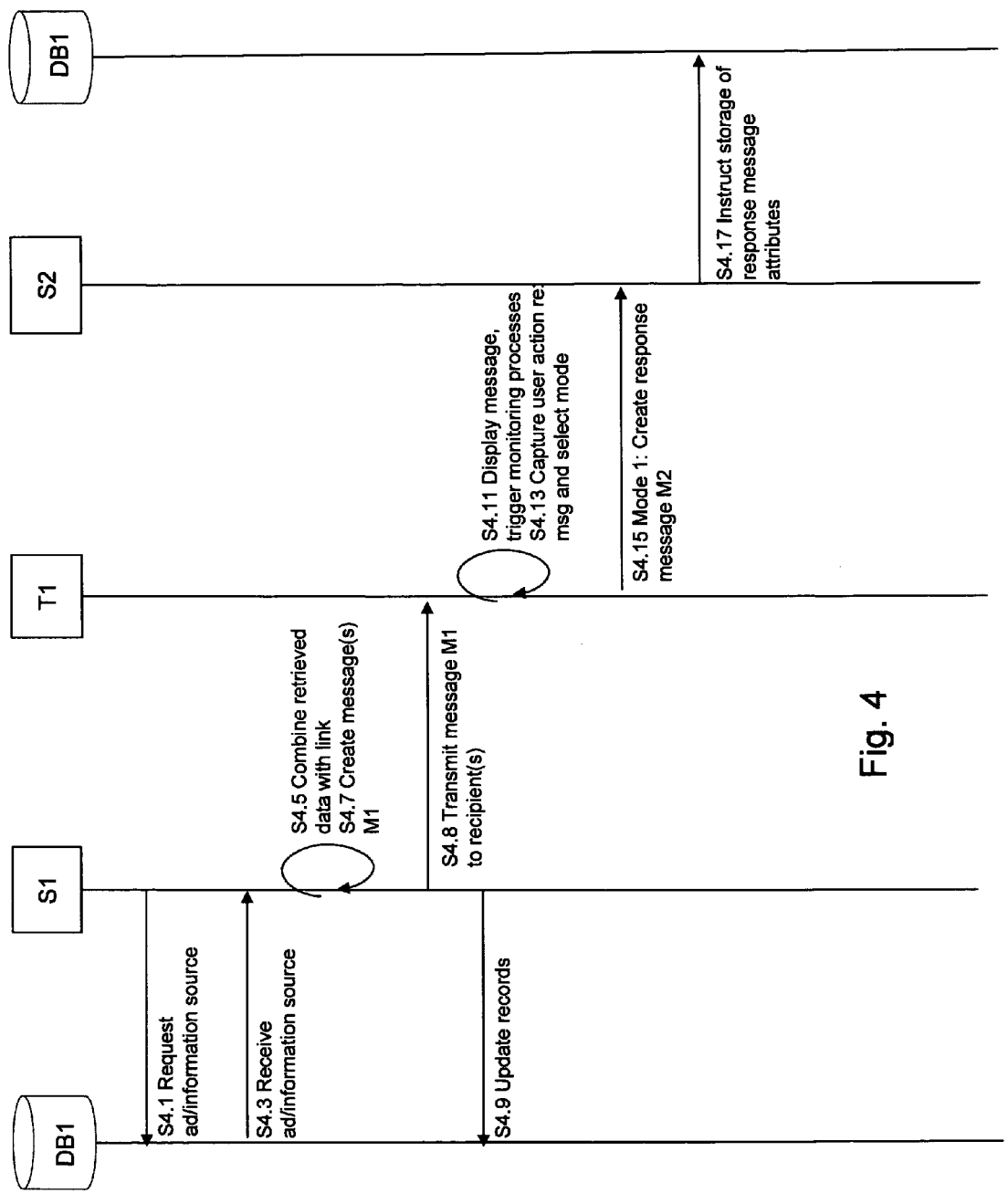
FIG. 4 is a timing diagram showing flow of messages between the network components shown in FIG. 1 according to an embodiment of the invention.

The functionality of the services servers S1, S2 will now be described with reference to FIGS. 2, 3 and 4. In addition to standard CPU, memory, data bus, Input/Output ports, data storage, and operating system programs, the first server S1 comprises certain bespoke functional components, namely message creation software component 201 for creating messages, content retrieval component 203 and object selection component 205, the latter two components 203, 205 being arranged to select data for insertion within the message. The message creation software component 201 triggers message creation based on either recipient or content as a pre-specified starting point. In other words, the message creation component 201 is either arranged to identify one or more message recipients and trigger retrieval of content for those recipients, or to identify content and trigger retrieval of recipients for the content.

In a first embodiment, a group of recipients is specified and content selected on the basis of the recipients. Accordingly, the characteristics of the group are used to define parameters that are used to retrieve the message content. The query can be formulated on the basis of parameters such as type of image, subject matter, date, etc. which have been formulated on the basis of demographic and preference data corresponding to the group of recipients. Once these parameters have been defined the content retrieval software component 203 is triggered to pass a query to the database DB1 (step S4.1), causing the database DB1 to query its records according to the parameters. In one arrangement the database DB1 is configured with filtering and matching functions known in the art for use in identifying records corresponding to the query, and the content identified by these functions is passed to the retrieval software component 203, together with a content identifier ID (step S4.3).

The first services server S1 also includes an object selection software component 205, which is arranged to identify control data specifying one or more user selectable objects for insertion within the message. The object can take the form of a push button or a link (such as a URL), either of which can be overlayed upon the content retrieved by the retrieval software component 203 or presented separate therefrom (e.g. in a different region of the display area of the recipient's terminal). As a further alternative the object selection component 205 can modify a portion of the retrieved content such that, when rendered on a display, the portion is highlighted in some manner (thus in this instance the object causes part of the content to stand out from other parts of the content). The choice of object type can be dependent on type of message being created, since certain types of messages inherently include means for specifying a particular type of object (e.g.

HTTP links can be embedded within MMS and WAP messages), while others, such as SMS, do not. Thus, in addition to identifying an object, the control data can include a set of processable instructions, e.g. in the form of a script or the like, which can be processed by a recipient's terminal so as to control rendering of the object and to trigger the recipient's terminal to perform certain actions in response to selection of the object. One such action is for the recipient's terminal to transmit a response message, and the control data include data specifying a network address to which such response messages are to be sent. In one arrangement the network address is that of the second services server S2.

The message creation component 201 is arranged to combine the control data with the content retrieved at step S4.3 so as to create a message body (step S4.5) for each of the recipients. In addition to the control data and retrieved content, the body of these messages includes a content identifier ID, and the body of the message is encapsulated within a message M1 for transmission to each recipient (steps S4.7, S4.8). Once these steps have been completed, the message creation component 201 is arranged to instruct the database DB1 to record the content identifier ID, object type and time of message transmission against each of the recipients (step S4.9).

Once received at a recipient terminal T1, and assuming the message M1 to have been selected by the user for display, the content and object within the message are displayed in accordance with the control data within the message body (step S4.11). In addition, the control data arms the recipient's terminal to monitor for selection of the object, and in response to selection thereof, causes the recipient's terminal to formulate and transmit a response message M2 (step S4.13, S4.15). In its simplest form the body of the response message M2 simply comprises the content identifier ID corresponding to the selected content, and in cases where the object is a URL or similar link, the content identifier ID and network address to which the response messages are to be transmitted can be embedded within the link. Selection of the link triggers formulation of a response message M2 on the basis of data embedded within the link as is known in the art.

Figure 5:
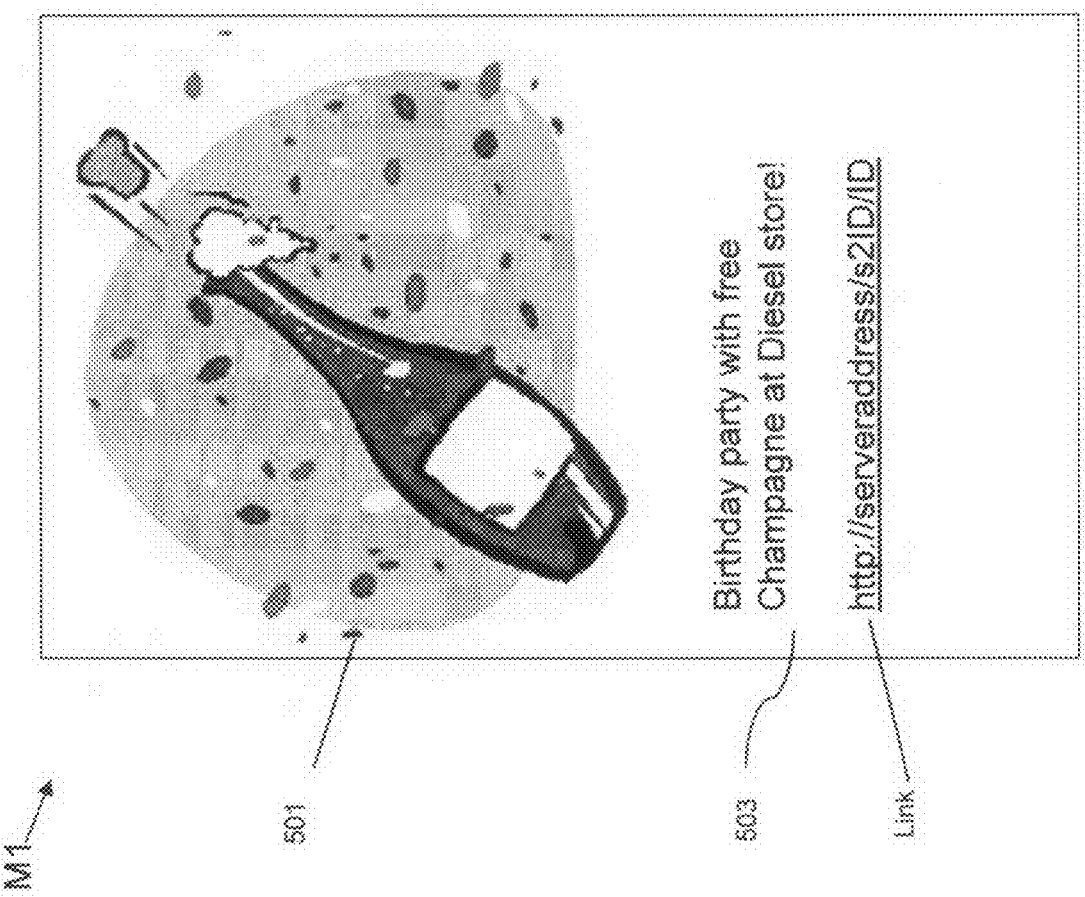
FIG. 5 is schematic diagram showing an example MMS message according to an embodiment of the invention.

When an MMS message includes images and audio portions, such portions are typically embedded within a presentation part of the message, meaning that the content type of the MMS message is application/vnd.wap.multipart.related, thereby identifying the message to comprise several parts. FIG. 5 shows an example MMS message M1 that has been compiled with the Smil™ language having image portion 501 and text portion 503. A suitable presentation part for this message M1 reads as follows:

```
<smil>
    <head>
        <layout>
            <root-layout width="160" height="140"/>
            <region id="Image" width="160" height="120" left="0"
            top="0"/>
            <region id="Text" width="160" height="20" left="0"
            top="120"/>
        </layout>
    </head>
    <body>
        <img src="Champagne.gif" region="Image" />
        <text src="Birthday party with free Champagne at Diesel
        store!region="Text"/>
        <text src="http://serveraddress/s2ID/ID/region="Text">
    </body>
</smil>
```

Instead of displaying the server address, the URL is preferably masked by means of a plain text phrase (e.g. "I will attend"), by means of HTML markup adapted for MMS.

Alternatively, and for example in the case of SMS messages, a "ready-made" response message M2 (with source (recipient) and destination (second services server S2) address and content identifier ID in the message body) can be encapsulated within message M1, which means that the action to be taken on the part of the recipient's terminal in response to selection of the object is simply to extract and transmit the ready-made message M2. In a further arrangement, the set of processable instructions causes the recipient's terminal to retrieve the content identifier ID from message M1 and to create the response message M2 having, as message body, the content identifier ID, and transmit this to the second services server S2. As an alternative to the message body of the response message M2 comprising the content identifier ID, the response message could include the content itself.

The latter two arrangements require the recipient's device to comprise a bespoke software application that can access SMS messages stored in the inbox so as to perform the above-mentioned functions; such an application could be embodied for example as a Symbian Series 60-compatible application or with a mobile operating system with similar capabilities. Alternatively the recipient's terminal could be equipped with a SIM Toolkit that has access to SMS messages stored in the SIM card. A drawback of these arrangements is that the original SMS message would have to include the identifier data, and would thus be displayed to the recipient. However, provided the content of the message is short, the identifier data could, for example, be separated therefrom by means of characters from the ASCII set that enable a clear delineation between message content and control data.

In the foregoing aspect of the invention, the messaging types have been described as store-and-forward messages such as SMS, MMS and WAP—each of which is stored in a network node until such time as delivery is possible to the intended recipient. Thus in comparison to prior art relating to email, such as is described in U.S. Pat. No. 7,072,947, there are only two contexts to be processed: a first context to send the message to the user and a second context when the object is selected. Tracking of access to messages thus involves fewer processing requirements than is required with known systems (from four to two), and incurs a corresponding reduction in network capacity and/or elements required to deliver the messages in a wireless data network or a network containing wireless elements. In addition, when the message M1 is an MMS or WAP message, mobile terminals are not required to be equipped with mobile client applications to benefit from embodiments of the invention, so that content can be sent to a wider range of terminals, and thus recipients.

Turning back to FIG. 3, since the response message M2 has, as its destination address, the second services server S2, any such response message M2 will be delivered thereto. As can be seen from FIG. 3, the second services server S2 includes a response-capture component 301, to which all response messages received by the second server S2 are directed, and a tracking component 303, which evaluates the response messages according to one or more criteria. Upon receipt of a response message, the response-capture component 301 is arranged to identify the terminal from which the response message emanates and to instruct the database DB1 to update a recipient record with data identifying time of receipt of the response message and the content identifier ID (step S4.17). This enables the tracking component 303 to evaluate recipient access to the transmitted message, and thus to the content. In the case where the content comprises advertising material in particular, the message creation component 201 can make use of this information when subsequently creating messages having pre-specified content. In other words, given it is known that certain recipients have reviewed certain types of content, the message creation component 201 can target those recipients with similar advertisements when creating future messages.

Figure 6:
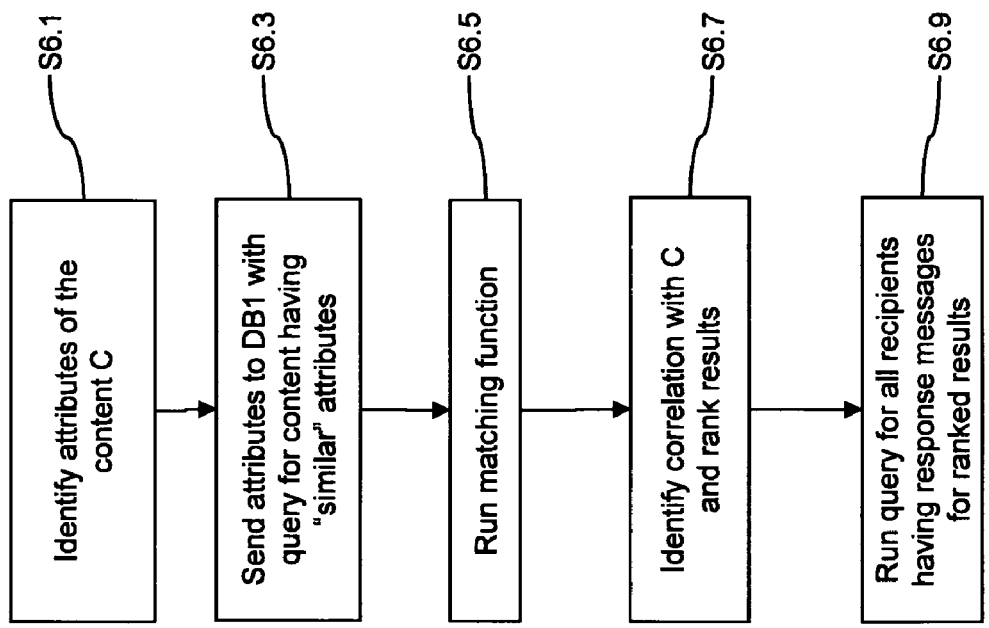
FIG. 6 is a schematic flow diagram showing a process for selecting recipients of a message according to an embodiment of the invention.

A process for performing such selection will now be described with reference to FIG. 6, in which it is assumed that the message creating component 201 has been provided with content C from content provider CP1. At step S6.1, the message creating component 201 identifies attributes of the content C, these typically being specified by the content provider CP1 and accompanying the content C in the form of a content identification record. The message creating component 201 then sends (step S6.3) a query to the database DB1 for previously transmitted content that matches the attributes identified at step S6.1. The database DB1 can invoke a matching algorithm which performs a search for previously transmitted content having all of the specified attributes, content having attributes synonymous with those specified, and content having one, two etc. of the specified attributes (step S6.5). Alternatively, the content identification record accompanying content C can include an identifier of previously provided, and related, content, for use in performing the search.

Content identifiers corresponding to the related and previously transmitted content are ranked in accordance with the correlation between their attributes and those of content C (sent in the query at step S6.3), and a ranked list is transmitted to the message creating component 201 at step S6.7. Once a list of all previously sent "similar" content has been established, the message creating software component 201 sends a query for recipients that have viewed the previously transmitted content for some or all of the content in the ranked list. This causes the database DB1 to retrieve details of all those recipients for which response messages M2 were received (step S6.9) and send the details to the message creating software component 201, for use in formulating messages having content C. It is to be noted that such subsequently transmitted messages can be formulated so as to include or exclude user selectable objects.

This therefore provides a mechanism for targeting follow-up advertisements to recipients that are known to have previously reviewed and thus become aware of particular advertisements.

Additional Details

For WAP type messages, the WAP gateway G1 can transmit data indicative of the messages being delivered to respective terminals, and this can be used to review the response messages, specifically to rank recipients that have transmitted response messages in terms of latency between delivery and review.

Whilst in the above the messaging types have been described as store-and-forward messages such as SMS, MMS and WAP, in relation to the aspect of selecting future recipients for receipt of content, the messaging type could include email messages, where emails are delivered to an email server corresponding to the domain of the recipient, and the email server of the recipient to creates and delivers a copy of the email to the recipient.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A system for selecting a recipient of a message on the basis of data identifying access to previously transmitted messages and tracking access status of said messages, each said message comprising content data for display within a display area of a receiving terminal and control data comprising data indicative of a user selectable portion within the display area, the system comprising:
   a first server comprising an interface for receiving content data having one of a plurality of different content types for use in creating said message, said message comprising a SMS, MMS or WAP; and
   a second server arranged to receive a response message, said response message being created by the receiving terminal in relation to the previously transmitted message and in accordance with a set of processable instructions therein, wherein the response message identifies the receiving terminal and upon receipt thereof the second server is arranged to update the access status of the previously transmitted message, whereby to update the tracking data;
   wherein a message generating system operatively coupled to the first server is arranged to select a recipient of the message on the basis of the received content data and the tracking data from the second server,
   wherein the message generating system is arranged to select a recipient by querying a database for previously transmitted content that matches a specified attribute, ranking the previously transmitted content specifying those attributes and creating a ranking list specifying recipients for which a response message was received; and
   wherein the message comprises the control data and the user selectable portion, the control data comprising the set of processable instructions for use in controlling operation of the receiving terminal in dependence on selection of the user selectable portion, the receiving terminal transmitting the response message to the second server to update the tracking data in response to selection of the user selectable portion.

2. The system according to claim 1, wherein the interface is responsive to receipt of said content data so as to identify one or more attributes thereof so as to assign content data to one of said plurality of different content types.

3. The system according to claim 1, wherein the message generating system is arranged to create a message on the basis of the received content data and the selected recipient.

4. The system according to claim 3, wherein the received content data is of a first type and the previously transmitted message contains content data of a second type, the message generating system being arranged to select content data for the message on the basis of a predetermined relationship between said first and second content types.

5. The system according to claim 4, wherein the first type of content data is different from said second type of content data.

6. The system according to claim 1, wherein the control data comprise the set of processable instructions for use in controlling operation of the receiving terminal in dependence on selection of the user selectable portion.

7. The system according to claim 6, further comprising a device arranged to receive the response message, said response message being created by the receiving terminal in relation to the previously transmitted message and in accordance with at least one of said set of processable instructions therein, wherein the response message identifies the receiving terminal and upon receipt thereof the device is arranged to update the access status of the previously transmitted message, whereby to update the tracking data.

8. The system according to claim 7, wherein the device is operatively coupled to the system.

9. The system according to claim 7, wherein the device has a network address and the control data associated with the previously transmitted message comprises data identifying a network address associated with the device, for use in formulating the response message.

10. The system according to claim 1, wherein the second server is arranged to update the access status so as to identify the receiving terminal from which the response message has emanated.

11. The system according to claim 1, wherein the user selectable portion comprises a link, and the message is created in accordance with the Wireless Application Part (WAP) Hypertext Protocol.

12. The system according to claim 1, wherein the content data comprise image data and the user selectable portion is an integral part of the image data.

13. A method for selecting a recipient of a message on the basis of data identifying access to previously transmitted messages and tracking access status of said messages, each said message comprising content data for display within a display area of a receiving terminal and control data comprising data indicative of a user selectable portion within the display area, the method comprising:
   in a first server comprising an interface, receiving content data having one of a plurality of different content types for use in creating said message, said message comprising a SMS, MMS or WAP;
   in a second server, receiving a response message, said response message being created by the receiving terminal in relation to the previously transmitted message and in accordance with a set of processable instructions therein, wherein the response message identifies the receiving terminal and upon receipt thereof the second server is arranged to update the access status of the previously transmitted message, whereby to update the tracking data;
   in a message generating system operatively coupled to the first server, selecting a recipient of the message on the basis of the received content data and the tracking data from the second server,
   in the message generating system selecting a recipient by querying a database for previously transmitted content that matches a specified attribute, ranking the previously transmitted content specifying those attributes and creating a ranking list specifying recipients for which a response message was received; and
   wherein the message comprises the control data and the user selectable portion, the control data comprising the set of processable instructions for use in controlling operation of the receiving terminal in dependence on selection of the user selectable portion, and in the receiving terminal transmitting the response message to the second server to update the tracking data in response to selection of the user selectable portion.

14. The method according to claim 13, further comprising identifying one or more attributes of the content data so as to assign content data to one of said plurality of different content types.

15. The method to claim 13, further comprising in the message generating system, creating a message on the basis of the received content data and the selected recipient.

16. The method according to claim 15, wherein the content data is of a first type and the previously transmitted message contains content data of a second type, the method further comprising, in the message generating system,
selecting content data for the message on the basis of a predetermined relationship between said first and second content types.

17. The method according to claim 16, further comprising differentiating the first type of content data from said second type of content data.

18. The method according to claim 13, further comprising using the control data which comprises the set of processable instructions to control operation of the receiving terminal in dependence on selection of the user selectable portion.

19. The method according to claim 18, further comprising receiving the response message in a device, creating the response message in the receiving terminal in relation to the previously transmitted message and in accordance with at least one of said set of processable instructions therein, wherein the response message identifies the receiving terminal and upon receipt thereof updating the access status of the previously transmitted message, whereby to update the tracking data.

20. The system according to claim 19, wherein the device has a network address and the control data associated with the previously transmitted message comprises data identifying a network address associated with the device, for use in formulating the response message by using the data to identify a network address associated with the device.

21. The method according to claim 13, further comprising updating the access status so as to identify the receiving terminal from which the response message has emanated.

22. The method according to claim 13, wherein the user selectable portion comprises a link, the method further comprising creating the message in accordance with the Wireless Application Part (WAP) Hypertext Protocol.

23. A computer program resident on a non transitory computer readable media and arranged to select a recipient of a message on the basis of data identifying access to previously transmitted messages and to track access status of said messages, each said message comprising content data for display within a display area of a receiving terminal and control data comprising data indicative of a user selectable portion within the display area, the computer program being arranged to:
in a first server comprising an interface, receive content data having one of a plurality of different content types for use in creating said message, said message comprising a SMS, MMS or WAP;
in a second server, receive a response message, said response message being created by the receiving terminal in relation to the previously transmitted message and in accordance with a set of processable instructions therein, wherein the response message identifies the receiving terminal and upon receipt thereof the second server is arranged to update the access status of the previously transmitted message, whereby to update the tracking data;
in a message generating system operatively coupled to the first server, selecting a recipient of the message on the basis of the received content data and the tracking data from the second server,
in the message generating system, selecting a recipient by querying a database for previously transmitted content that matches a specified attribute, ranking the previously transmitted content specifying those attributes and creating a ranking list specifying recipients for which a response message was received; and
wherein the message comprises the control data and the user selectable portion, the control data comprising a set of processable instructions for use in controlling operation of the receiving terminal in dependence on selection of the user selectable portion, and in the receiving terminal transmit the response message to the second server to update the tracking data in response to selection of the user selectable portion.

24. The computer program according to claim 23, wherein the computer program is further arranged to identify one or more attributes of the content data so as to assign content data to one of said plurality of different content types.

25. The computer program according to claim 23, wherein the computer program is further arranged to, in the message generating system, create a message on the basis of the received content data and the selected recipient.

26. The computer program according to claim 23, wherein the content data is of a first type and the previously transmitted message contains content data of a second type, the computer program is further arranged to, in the message generating system, select content data for the message on the basis of a predetermined relationship between said first and second content types.

27. The computer program according to claim 26, wherein the computer program is further arranged to differentiate the first type of content data from said second type of content data.

28. The computer program according to claim 23, wherein the computer program is further arranged to use the control data which comprises the set of processable instructions to control operation of the receiving terminal in dependence on selection of the user selectable portion.

29. The computer program according to claim 28, wherein the computer program is further arranged to receive the response message in a device, and create the response message in the receiving terminal in relation to the previously transmitted message and in accordance with at least one of said set of processable instructions therein, wherein the response message identifies the receiving terminal and upon receipt thereof updates the access status of the previously transmitted message, whereby to update the tracking data.

30. The computer program according to claim 29, wherein the device has a network address and the control data associated with the previously transmitted message comprises data identifying a network address associated with the device, wherein the computer program is further arranged to formulate the response message by using the data to identify a network address associated with the device.

31. The computer program according to claim 23, wherein the computer program is further arranged to update the access status so as to identify the receiving terminal from which the response message has emanated.

32. The computer program according to claim 23, wherein the user selectable portion comprises a link, wherein the computer program is further arranged to create the message in accordance with the Wireless Application Part (WAP) Hypertext Protocol.

\* \* \* \* \*